Oct. 31, 1933.            H. F. SMITH            1,932,492
REFRIGERATING APPARATUS
Original Filed Sept. 29, 1930    3 Sheets-Sheet 1

Harry F. Smith INVENTOR
BY
Spencer, Hardman & Fehr ATTORNEYs

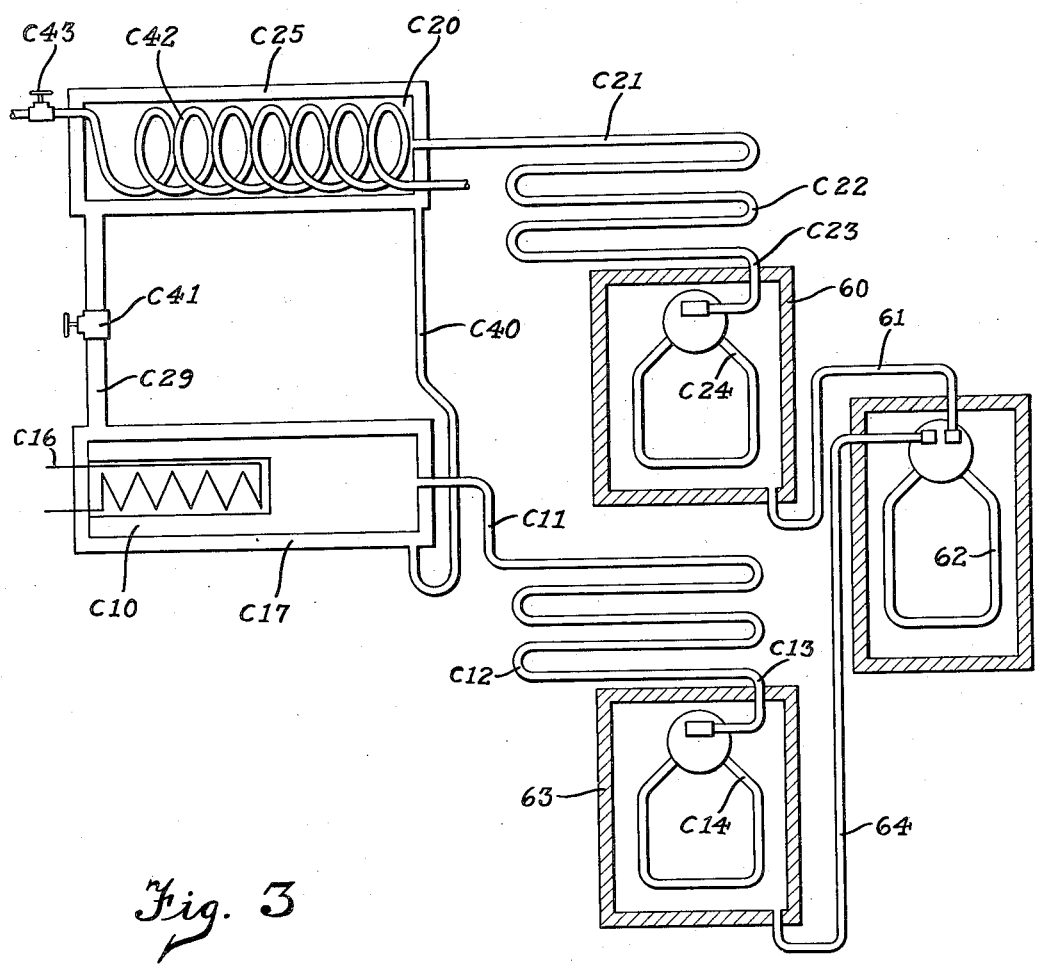

Patented Oct. 31, 1933

1,932,492

UNITED STATES PATENT OFFICE 1,932,492

REFRIGERATING APPARATUS

Harry F. Smith, Dayton, Ohio, assignor to Frigidaire Corporation, Dayton, Ohio, a corporation of Delaware Application September 29, 1930. Serial No. 485,109. Renewed March 15, 1933

20 Claims. (Cl. 62—118)

This invention relates to refrigerating apparatus, and more particularly to refrigerating apparatus of the absorption type.

In absorption refrigerating apparatus, refrigeration is produced by evaporating a liquid refrigerant and absorbing the vapors thereof in an absorbent, or absorption material. The material is subsequently heated to drive off the vapors, which vapors are condensed in a condenser and returned in liquid form to the evaporator. This will be made clearer by referring to the intermittent absorption machine as a specific example.

The words "intermittent absorption machine" are generally used to indicate a refrigerating machine comprising a generator-absorber, a condenser, and an evaporator. The generator-absorber is charged with a substance, either liquid or solid, capable of absorbing large quantities of refrigerant gas under different degrees of temperature. During one cycle of operation, the generator-absorber is heated, thereby driving off the refrigerating gas to a condenser where the liberated gas is condensed to a liquid, the liquid being fed to an evaporator. This is called the distillation or the heating cycle. During the other cycle of operation, the generator-absorber is cooled causing a reduction in pressure therein. This reduction in pressure causes the liquid refrigerant within the evaporator to evaporate and the vapors, passing back to the generator-absorber, are re-absorbed in the material within the generator-absorber. This cycle is known as the refrigerating cycle or the absorption cycle. Thus, this type of machine operates to produce refrigeration intermittently, that is only during the refrigerating cycle.

The distillation cycle wherein refrigerant is liberated from the absorbent material involves an endothermic reaction, and therefore, heat must be supplied to the absorbent material to effect a liberation of refrigerant gas therefrom. On the other hand, the absorption or refrigerating cycle is an exothermic reaction, and consequently heat must be removed therefrom if the reaction is to continue. Heretofore, the heat necessary to produce the endothermic reaction has been supplied from an external source, while the heat given up by the exothermic reaction has been dissipated to the atmosphere and consequently wasted.

All other types of refrigerating apparatus of the absorption type are open to the same objections. That is, the heat of absorption, or the heat generated by the exothermic reaction, has been wasted and consequently the refrigerating cycle has been rendered more or less inefficient.

One of the objects of this invention therefore, is to increase the efficiency of absorption machines in general, by utilizing the heat generated by the exothermic absorption reaction to produce a useful result. More specifically, it is an object of this invention to utilize the heat of absorption to aid in supplying liquid refrigerant to the evaporator, that is, to put back into the system the heat taken out of the system in the form of heat of absorption.

A further object of this invention is to overcome the objections to prior intermittent absorption machines by constructing and arranging a plurality of such machines to operate intermittently and alternately to produce substantially constant and continuous refrigeration. More specifically, it is an object of this invention to provide a refrigerating system consisting of two intermittent absorption machines wherein the heat of absorption from one intermittent machine is used as the heat necessary to carry on the endothermic reaction in the other intermittent absorption machine.

A further object of this invention is to provide a plurality, for instance, two refrigerating machines of the intermittent absorption type, one of said machines being charged with an absorbent material operating at a substantially high temperature and the other of said machines being charged with an absorbent material which operates, that is, absorbs and liberates refrigerant gas at a substantially lower temperature, and wherein the heat of absorption from the higher operating absorbent material is used as the heat necessary to carry on the endothermic reaction with the absorbent operating at this lower operating temperature range.

Further objects and advantages of the present invention will be apparent from the following description, reference being had to the accompanying drawings, wherein a preferred form of the present invention is clearly shown.

In the drawings:

Fig. 3 is a diagrammatical view of still another modified form of absorption refrigerating apparatus embodying features of this invention.

In order to illustrate the broad aspect of my invention of utilizing the heat of absorption for useful purposes, as well as to illustrate the more specific aspect of utilizing the heat of absorption to render an intermittent absorption machine capable of producing continuous refrigeration, I have disclosed a plurality of intermittently operating absorption machines, so arranged to produce substantially continuous refrigeration. Each machine is provided with a generator-absorber, one generator-absorber being arranged in heat exchange relation with the other generator-absorber. One of the generator-absorbers is charged with a material capable of liberating and absorbing large quantities of a refrigerant gas at a substantially high range of temperatures, for instance between 400° and 300° F. The second of said generator absorbers is charged with a material capable of liberating and absorbing large quantities of refrigerant gas at a lower range of temperatures, for instance, between 200° and 100° F. By so charging the respective generator absorbers, the fluid used for cooling the high temperature range absorbent material may be passed in heat exchange relation with the low temperature range material to heat the latter. For instance, during the absorption or the refrigerating cycle of the high temperature range material, a liquid such as water used to cool the high temperature operating absorbent material from 400° to 300° F. will leave the vicinity of the said material at a temperature of substantially 250° to 300° F. and consequently may be circulated in heat exchange relation with the low temperature range material at a temperature sufficient to cause the low temperature range material to liberate its refrigerant gas. It is to be understood, however, that this invention in its broadest aspect is directed to the idea of utilizing the heat of absorption within one machine for supplying the heat necessary to carry on the endothermic reaction in another machine. Thus, the invention in its broadest aspect is equally applicable to refrigerating systems employing apparatus of the so-called continuous type comprising a generator, a condenser, an evaporator, and an absorber.

Figure 1:
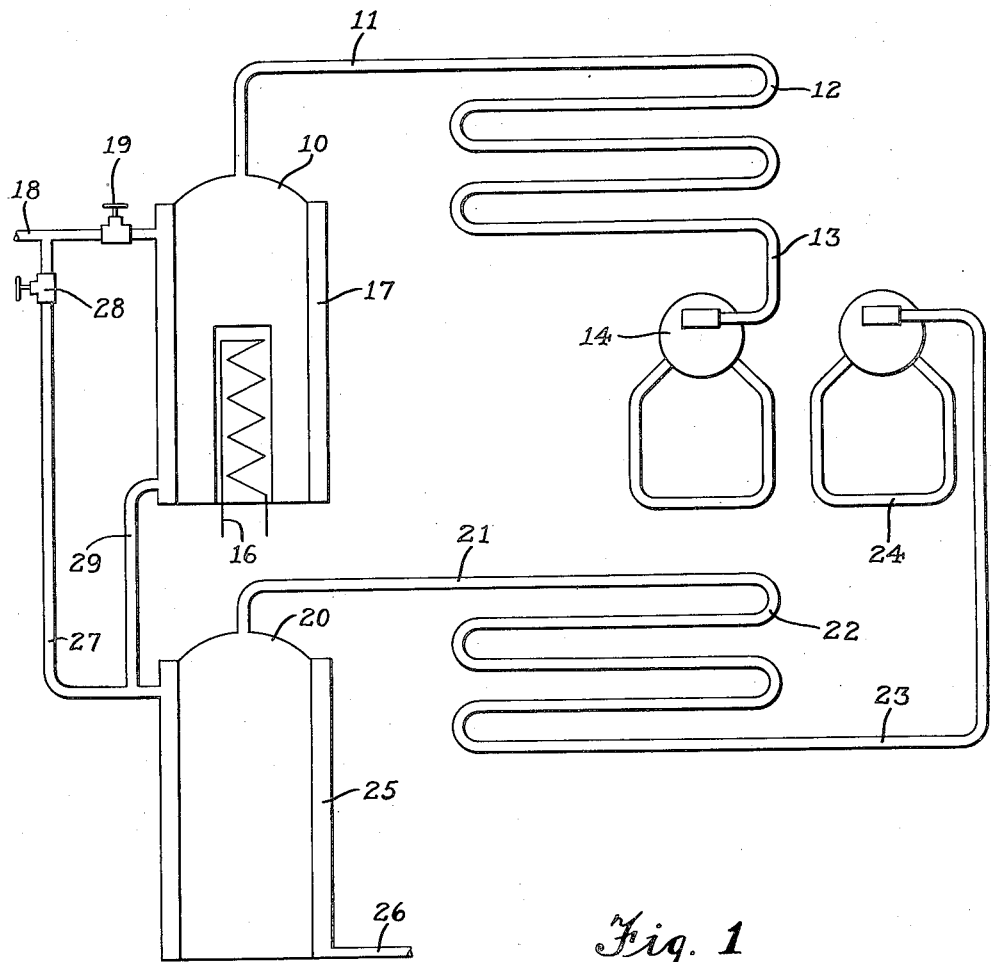
Fig. 1 is a diagrammatical view of an absorption refrigerating system embodying features of this invention.

Referring to Fig. 1 of the drawings, I have disclosed a generator-absorber 10 connected through a conduit 11 to a condenser 12 which is connected to discharge through the conduit 13 into an evaporator 14. The generator-absorber 10 is provided with heating means in the form of a resistance coil 16, and with cooling means in the form of a jacket 17 connected to a water supply 18, through which cooling water may be circulated under the control of valve 19 to cool the material within the generator-absorber 10 during the refrigerating cycle. A second generator-absorber 20 is connected through a conduit 21 to a condenser 22 which is connected to discharge through a conduit 23 into the second evaporator 24. It should be understood that both the evaporators are located within the same compartment to be cooled if continuous refrigeration is desired, whereas each evaporator may be positioned within separate compartments if intermittent refrigeration is sufficient.

Means are provided for heating and cooling the generator-absorber 20. In this modification the heating and cooling means is in the form of a jacket 25 discharging to waste through the conduit 26 and connected to the source of water supply 18 through a conduit 27 provided with a controlling valve 28.

The generator-absorber 10 is charged with a material capable of liberating refrigerant gas such as ammonia at a high temperature, for instance approximately 400° F. and capable of absorbing refrigerant gas at a high temperature, for instance approximately 300° F. Such a material, for instance, may be ferrous chloride, $FeCl_2$, operating between approximately 235° and 370° F., calcium bromide, $CaBr_2$, operating substantially between 200° and 323° F., strontium iodide, $SrI_2$, operating substantially between 250° and 390° F., ferrous bromide, $FeBr_2$ operating between substantially 305° and 480° F., and many other substances.

The generator-absorber 20 is charged with a material capable of liberating and absorbing a refrigerant gas, such as ammonia, at a substantially lower temperature than the operating temperatures of the absorbent material within the generator-absorber 10. For instance, the material within the generator-absorber 20 may be such as will generate or liberate refrigerant gas when heated to approximately 200° F., and will absorb refrigerant gas when cooled to substantially 100° F. Examples of such substances are calcium chloride, $CaCl_2$, operating between approximately 100° and 200° F.; strontium chloride, $SrCl_2$, operating substantially between 100° and 215° F.; barium bromide, $BaBr_2$, operating substantially between 95° and 185° F. Other examples are cadmium chloride, strontium bromide, magnesium chloride, manganese chloride, barium iodide, and ferric chloride. The refrigerating gas in both cases may be ammonia.

In operation of the apparatus disclosed in Fig. 1, assume that both generator-absorbers 10 and 20 are charged with their respective high temperature and low temperature absorbents, and that the refrigerant within both systems is absorbed by the absorbent material. The valves 19 and 28 are then closed and the resistance coil 16 is placed in circuit causing the generator-absorber 10 to be heated to approximately 400° F. Refrigerant is then driven out from the absorbent material within the generator-absorber 10 and, passing through the conduit 11, is condensed in the condenser 12 and finally collected in liquid form within the evaporator 14. After substantially all the refrigerant gas has been collected within the evaporator 14, the heating coil 16 is cut out of circuit and the apparatus is ready to produce refrigeration. The valve 19 is then opened, allowing cooling water to flow through the jacket 17 surrounding the generator-absorber 10, cooling the contents of the generator-absorber 10 to substantially 300° F. The cooling of the generator-absorber 10 slightly lowers the pressure within that machine and permits the liquid refrigerant within the evaporator 14 to evaporate, thereby producing refrigeration. The vapors, passing back through the condenser 12 and the conduit 11, are then re-absorbed within the absorbent material at substantially 300° F. The cooling water, entering the jacket 17, vaporizes as soon as it contacts with the generator-absorber 10 and passes in the form of steam down through the conduit 29 into the jacket 25 surrounding the generator-absorber 20. The steam entering the jacket 25 will be at a temperature of substantially 200° to 300° F.; and consequently will heat the generator-absorber 20 sufficiently to drive off the refrigerant absorbed by the material within the generator absorber 20. This liberated refrigerant will pass through the conduit 21 into the condenser 22 where it will liquefy and finally collect within the evaporator 24. Thus, while the generator-absorber 10 is being cooled to produce refrigeration in the evaporator 14, the generator-absorber 20 is being heated to supply refrigerant to the evaporator 24.

As soon as the required amount of liquid refrigerant has evaporated within the evaporator 14 and the vapors thereof have been collected or absorbed in the material within the generator-absorber 10, the valve 19 is closed, the valve 28 is opened, and the resistance coil 16 is again placed in circuit to heat the generator-absorber 10. Cooling water, flowing through the conduit 27 and through the jacket 25 surrounding the generator-absorber 20, will lower the pressure within the second system causing the refrigerant within the evaporator 24 to evaporate, the vapors being reabsorbed in the material within the generator-absorber 20. At the same time the generator-absorber 10 is being heated by the resistance coil 16, liberating the absorbed refrigerant and again supplying the evaporator 14 with its liquid refrigerant. Thus, while the evaporator 24 is producing refrigeration, the evaporator 14 is being supplied with liquid refrigerant.

By providing two intermittently operating absorption machines, one producing refrigeration while the other is supplying refrigerant to its evaporator, substantially continuous refrigeration is produced. In addition, by providing the cascade arrangement, that is, by providing an absorbent material operating at a substantially high range of temperatures and an absorbent operating at a substantially low range of temperatures, the heat generated by the exothermic absorbing reaction in one of the machines is used as the heat necessary to be supplied to produce the endothermic reaction in the other intermittent machine. By so arranging the machines, constant refrigeration is produced by supplying heat from a single external source, thereby eliminating all complicated apparatus for shifting the Bunsen burner from one generator-absorber to the other and eliminating a large number of complicated valves.

While I have disclosed manually operated valves in the water supply line to both generator-absorbers, obviously automatic means for actuating these valves, as well as automatic means for actuating the heating coil may be provided. These valves and resistance coil may be actuated automatically in response to the temperature within the generator-absorber or to the quantity of liquid collected in the evaporators or in any other known manner.

Figure 2:
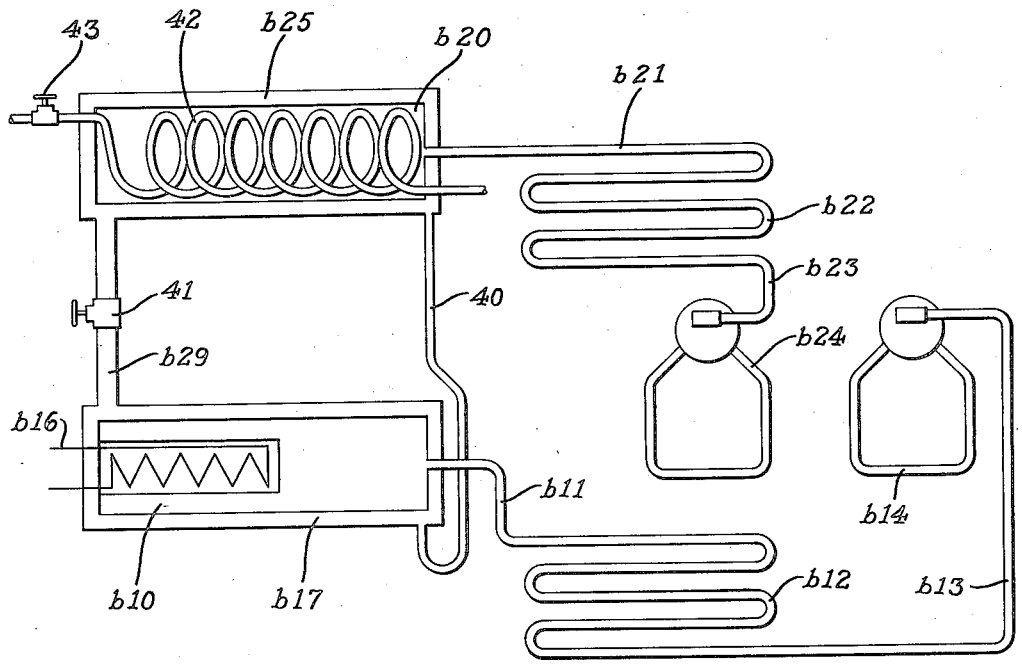
Fig. 2 is a diagrammatical view of a modified form of absorption refrigerating apparatus.

In Fig. 2 I have disclosed a system substantially the same as that disclosed in Fig. 1 and the various parts of the apparatus disclosed in Fig. 2 which are common to those disclosed in Fig. 1 have been indicated by the same reference numerals preceded by the letter "b". The difference in the two structures is mainly in the fact that the water used to cool the high temperature generator-absorber and to heat the low temperature generator-absorber is used over and over again in a closed system, thereby transferring from one generator-absorber to the other the specific heat of the generator-absorbers and thereby avoiding the loss of a large quantity of heat. For instance, the high temperature generator-absorber $b10$ is surrounded by the jacket $b17$, while the low temperature generator-absorber $b20$ is surrounded by the jacket $b25$, and these two jackets are connected in a closed system by means of the conduits $b29$ and 40, the first named conduit being provided with a valve 41 for a purpose hereinafter set forth. In addition, the low temperature generator-absorber $b20$, is provided with a cooling coil 42 through which cooling water is adapted to flow under the control of the valve 43. It will be understood that substantially the same types of materials are placed within the high temperature generator-absorber and within the low temperature generator-absorber as are used in the modification disclosed in Fig. 1.

In the operation of the device disclosed in Fig. 2 the closed circuit, including the jackets $b17$ and $b25$ and the two conduits $b29$ and 40, is provided with a liquid, such as water, sufficient to submerge the high temperature generator-absorber $b10$. The resistance coil $b16$ is placed in circuit and the generator-absorber $b10$ is heated to aproximately 400° F. This heat will vaporize or change into steam a small part of the water contained within the jacket $b17$ and the pressure generated thereby will force the remaining liquid upwardly through the conduit 40 into the jacket $b25$ surounding the generator-absorber $b20$. During this operation the valve 41 is closed. After sufficient liquid refrigerant has been collected in the evaporator $b14$, the heating of the generator-absorber $b10$ is discontinued, and the valve 41 is opened. The liquid contained within the jacket $b25$ will then circulate downwardly through the conduit 40 into the jacket $b17$ where it will cool the contents of the generator-absorber $b10$ to approximately 300° F. Refrigeration will then take place within the evaporator $b14$ in the same way as set forth in connection with the modification shown in Fig. 1. The cooling water contacting with the heat generator-absorber 10B will vaporize or change into steam and this steam will pass upwardly through the conduit $b29$ into contact with the generator-absorber $b20$, heating the contents thereof to approximately 200° F. In the jacket $b25$ the steam will, of course, condense and will return to the jacket $b17$ through the conduit 40. Heating of the generator-absorber $b20$ will, as set forth in connection with Fig. 1, supply liquid refrigerant to the evaporator $b24$. At the end of this distillation cycle, the valve 41 will be again closed, the heating of the generator-absorber $b10$ will be again initiated and the valve 43 will be open allowing cooling water to flow through the conduit 42 located within the generator-absorber $b20$. Refrigeration will then be produced in evaporator $b24$ while evaporator $b14$ is being supplied with refrigerant. Thus, in the apparatus disclosed in Fig. 2, the two intermittent absorption machines are so arranged as to produce continuous refrigeration in the manner described in connection with Fig. 1, while at the same time, the specific heat of one generator-absorber is transferred to the other generator-absorber rather than to waste as disclosed in Fig. 1. In this modification, as well as that disclosed in Fig. 1, the heat of absorption from the high temperature absorbent is used as the heat necessary to produce the endothermic reaction in the low temperature absorbent material.

In both the modifications shown in Figs. 1 and 2, there is disclosed an individual evaporator for each generator-absorber. It may be, however, that a single evaporator producing continuous refrigeration is desirable and in that case the arrangement disclosed in Fig. 3 is one manner in which such a single evaporator may be used. In this modification, the parts of the apparatus corresponding to the parts disclosed in Fig. 2 are represented by the same reference characters preceded by the letter "c". In order to produce continuous refrigeration, however, with the use of a single evaporator within the compartment to be cooled, there is provided in connection with the evaporators a secondary refrigerating circuit. For instance, the evaporator c14 is arranged in heat exchange relation with an insulated container 60 which is in open communication through the conduit 61 with the evaporator 62. The evaporator c24 is likewise arranged in heat exchange relation with an insulated container 63, which container is in open communication with the same evaporator 62 through the conduit 64. Thus, the containers 60, 63, the evaporator 62, and the two conduits 61, 64, form a closed secondary refrigerating circuit, which circuit is charged with a substantial amount of volatile liquid, for instance $SO_2$ or ammonia. In operation, assume that the evaporator c24 is supplied with its predetermined quantity of liquid refrigerant while the evaporator c14 is being supplied with liquid refrigerant as set forth in connection with the apparatus disclosed in Figs. 1 and 2. The evaporation of the liquid refrigerant within the evaporator c24 will lower the temperature within the container 60, causing a reduction in pressure therein and consequently a reduction in pressure throughout the entire secondary circuit. This reduction in pressure will cause an evaporation of the liquid refrigerant within the evaporator 62 of the secondary circuit, and the vapors, passing through the conduit 61, will condense on the evaporator c24, and collect within the container 60. As soon as all the liquid refrigerant within the evaporator c24 has been evaporated and the refrigerating cycle has been reversed so that the evaporator c24 is being supplied with liquid refrigerant and the evaporator c14 is producing refrigeration, the refrigerant vapors from the evaporator 62 will then pass through the conduit 64 and condensing on the evaporator c14 will collect in the container 63. In the meantime, the first gas liberated from the generator-absorber c20 will pass through the condenser c22 and will condense within the evaporator c24. The heat given up thereby will vaporize a little of the liquid refrigerant within the container 60, and the pressure increase incident thereto will force the liquid refrigerant collected in the container 60 from the container 60 back through conduit 61 into the evaporator 62. Thus continuous refrigeration is produced within the evaporator 62 by the aid of the two intermittently operating evaporators c14 and c24.

The evaporator 62 may be located above the evaporators c14 and c24 for the liquid refrigerant collecting in the containers 60 and 63 will be automatically returned to the evaporator 62 at intervals.

It will thus be seen that by the proper selection of materials to be used in the various generator-absorbers, substantially continuous refrigeration may be produced by the use of a plurality of intermittently operating machines. At the same time, substantially constant refrigeration may be produced by employing a single source of external heat, that is, heat applied to but one generator-absorber, the heat applied to the second generator-absorber being wholly obtained from the heat withdrawn from the first generator-absorber.

Throughout the specification, the terms absorbent, absorbing and absorption have been used. It should be understood, however, that my invention is applicable to all types of absorption refrigerating apparatus, whether the materials in the generator-absorber are capable of adsorbing the refrigerant gas or of absorbing the refrigerant gas. In the claims that follow, the terms absorbent, absorbing and absorption have been used to include both the absorbing and adsorbing of a gas in a material whether that material is a solid capable of adsorbing a gas, a solid capable of absorbing a gas or a liquid capable of absorbing a gas.

While the form of embodiment of the present invention as herein disclosed, constitutes a preferred form, it is to be understood that other forms might be adopted, all coming within the scope of the claims which follow.

What is claimed is as follows:

1. Refrigerating apparatus comprising two intermittently operating absorption machines, each machine including a generator-absorber, one of said generator-absorbers being charged with a material capable of absorbing and liberating refrigerant gas at a high range of temperatures, and the other generator-absorber being charged with a material capable of liberating and absorbing refrigerant gas under a lower range of temperatures, and means whereby the heat of absorption from the material of the first of said generator-absorbers may be used as the heat necessary to cause liberation of refrigerant from the material in the second named generator-absorber.

2. Refrigerating apparatus comprising two intermittently operating absorption machines, each machine including a generator-absorber, means for supplying heat from an external source to one of said generator-absorbers, means for heating the other of said generator-absorbers, said last named means comprising means for utilizing the heat extracted from the first of said generator-absorbers.

3. Refrigerating apparatus comprising in combination a plurality of intermittently operating absorption machines, each machine including a generator-absorber, means for heating one of said generator-absorbers, said first named generator-absorber comprising the sole means for heating the second of said generator-absorbers.

4. Refrigerating apparatus of the absorption type comprising two intermittently operating absorption machines, each machine including a generator-absorber, one of said generator-absorbers containing an absorbent material operating at a high range of temperatures and the other generator-absorber containing an absorption material operating at a lower range of temperatures, means for heating said high temperature range material, means for cooling said high temperature range material, and means for utilizing the heat extracted by cooling said high temperature range material for heating said low temperature range material.

5. Refrigerating apparatus comprising at least two intermittently operating absorption machines, each of said machines including a generator-absorber, one of said generator-absorbers being charged with an absorbent material operating at a high range of temperatures and another generator-absorber charged with a material operating at a low range of temperatures, means for heating said high temperature range material from an external source, and means for transferring heat from said high temperature range material to said low temperature range material.

6. Refrigerating apparatus comprising at least two intermittently operating absorption machines, each machine including a generator absorber, one of said generator-absorbers being charged with an absorbent material operating at a high range of temperatures, and another generator-absorber being charged with a material operating at a lower range of temperatures, a single external source of heat for supplying heat to both of said generator-absorbers, said heat being supplied directly to said high temperature range material and indirectly through said high temperature range material to said low temperature range material.

7. A method of producing refrigeration which comprises extracting heat from a material capable of absorbing refrigerant gas at a substantially high temperature range and transferring the heat so extracted to an absorption material capable of liberating refrigerant gas at a lower temperature.

8. Refrigerating apparatus comprising at least two intermittently operating absorption machines, each machine including a generator-absorber, one generator-absorber being charged with a material capable of absorbing and liberating refrigerant gas at a substantially high range of temperatures, the other generator-absorber being charged with a material capable of absorbing and liberating refrigerant gas at a lower range of temperatures, means for heating said generator-absorbers, means for cooling said generator-absorbers, all of the heat supplied to both of said generator-absorbers passing first to the first-named generator-absorber.

9. Refrigerating apparatus comprising at least two intermittently operating absorption machines, each machine including a generator-absorber, one generator-absorber being charged with a material capable of absorbing and liberating refrigerant gas at a substantially high range of temperatures, the other generator-absorber being charged with a material capable of absorbing and liberating refrigerant gas at a lower range of temperatures, means for heating said generator-absorbers, and means for cooling said generator-absorbers, the heat of absorption from both of said generator absorbers passing through the second-named generator-absorber.

10. Refrigerating apparatus comprising at least two intermittently operating absorption machines, each machine including a generator-absorber, one generator-absorber being charged with a material capable of absorbing and liberating refrigerant gas at a substantially high range of temperatures, the other generator-absorber being charged with a material capable of absorbing and liberating refrigerant gas at a lower range of temperatures, means for heating said generator-absorbers, and means for cooling said generator-absorbers, all of the heat supplied to both of said generator-absorbers passing first to the first-named generator-absorber, and all of the heat of absorption from both of said generator-absorbers passing through the second-named generator-absorber.

11. The method of producing a refrigerating effect which comprises evaporating a liquid refrigerant, absorbing the vapors, with the liberation of heat, in an absorbent material at a substantially high temperature, transferring the heat so liberated to a second absorbent material operating at a lower temperature and liberating refrigerant gas from the last named absorbent material.

12. Refrigerating apparatus comprising two intermittently operating absorption machines, each machine including a generator-absorber, a single source of external heat for both of said generator-absorbers, one of said generator-absorbers obtaining all of its heat through the other generator-absorber.

13. Refrigerating apparatus comprising a plurality of intermittently operating absorption machines, each machine including a generator-absorber, means for heating said generator-absorbers, means for cooling said generator-absorbers, all of the heat required to heat said generator-absorbers being supplied from an external source to a single one of said generator-absorbers.

14. Refrigerating apparatus comprising a plurality of intermittently operating absorption machines, each machine including a generator-absorber, means for heating said generator-absorbers, means for cooling said generator-absorbers, all of the heat of absorption extracted from both of said generator-absorbers passing through one of said generator-absorbers.

15. Refrigerating apparatus comprising a plurality of intermittently operating absorption machines, each machine including a generator-absorber, means for heating said generator-absorbers, means for cooling said generator-absorbers, all of the heat required to heat said generator-absorbers being supplied from an external source to a single one of said generator-absorbers, all of the heat of absorption extracted from both of said generator-absorbers passing through one of said generator-absorbers.

16. Refrigerating apparatus comprising two intermittently operating absorption machines, each machine including a generator-absorber, one of said generator-absorbers being charged with a solid material capable of absorbing and liberating refrigerant gas at a high range of temperatures, and the other generator-absorber being charged with a solid material capable of liberating and absorbing refrigerant gas under a lower range of temperatures, and means whereby the heat of absorption from the solid material of the first of said generator-absorbers may be used as the heat necessary to cause liberation of refrigerant from the solid material in the second named generator-absorber.

17. Refrigerating apparatus comprising two intermittently operating absorption machines, each machine including a generator-absorber, one of said generator-absorbers being charged with a material capable of absorbing and liberating refrigerant gas at a high range of temperatures, and the other generator-absorber being charged with a material capable of liberating and absorbing refrigerant gas under a lower range of temperatures, and means whereby the heat of absorption from the material of the first of said generator-absorbers may be used as the heat necessary to cause liberation of refrigerant from the material in the second named generator-absorber, said last named means comprising a closed fluid circuit in heat exchange relation with both of said generator-absorbers.

18. Refrigerating apparatus comprising two intermittently operating absorption machines, each machine including a generator-absorber, one of said generator-absorbers being charged with a solid material capable of absorbing and liberating refrigerant gas at a high range of temperatures, and the other generator-absorber being charged with a solid material capable of liberating and absorbing refrigerant gas under a lower range of temperatures, and means whereby the heat of absorption from the solid material of the first of said generator-absorbers may be used as the heat necessary to cause liberation of refrigerant from the solid material in the second named generator-absorber, said last named means comprising a closed fluid circuit in heat exchange relation of both of said generator-absorbers.

19. Refrigerating apparatus comprising at least two intermittently operating absorption machines, each machine including a generator-absorber, one of said generator-absorbers being charged with a solid absorbent material operating at a high range of temperatures, and another generator-absorber being charged with a solid material operating at a lower range of temperatures, a single external source of heat for supplying heat to both of said generator-absorbers, said heat being supplied directly to said high temperature range material and indirectly through said high temperature range material to said low temperature range material.

20. Refrigerating apparatus comprising at least two intermittently operating absorption machines, each machine including a generator-absorber, one of said generator-absorbers being charged with a solid material operating at a high range of temperatures, and another generator-absorber being charged with a solid material operating at a lower range of temperatures, a single external source of heat for supplying heat to both of said generator-absorbers, and a heat exchange circuit having a portion in heat exchange relation with one generator-absorber and a portion in heat exchange relation with the other generator-absorber, said heat exchange circuit comprising the sole means for supplying the heat of one of said generator-absorbers.

HARRY F. SMITH.